A. A. REED.
Machine for Uniting the Soles and Uppers of Boots and Shoes.
No. 5,163. Reissued Nov. 26, 1872.
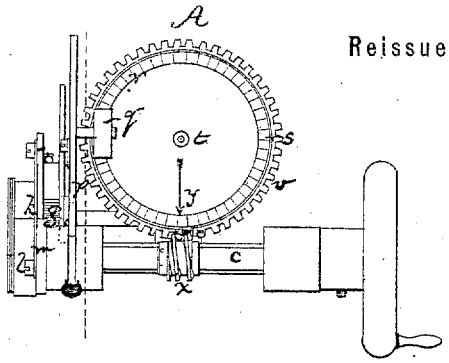
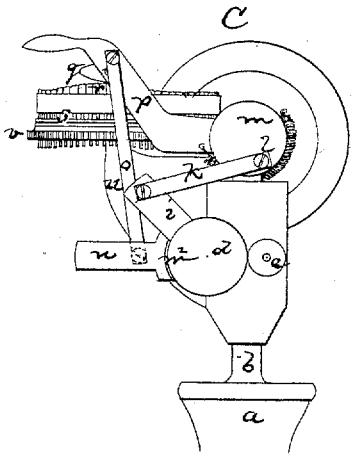
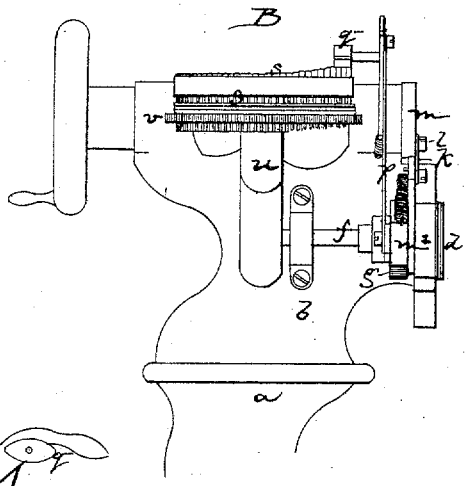
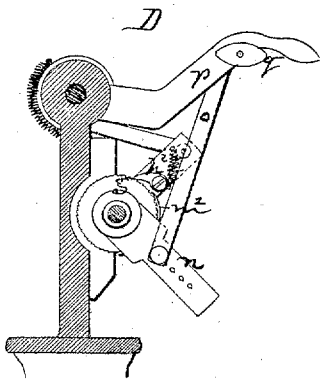
Witnesses.
M. W. Frothingham.
S. H. Latimer.
Inventor.
Andrew A. Reed.
By his Attys.
Crosby & Gould
AM. PHOTO-LITHOGRAPHIC CO. N.Y. (OSBORNE'S PROCESS.)

UNITED STATES PATENT OFFICE.

ANDREW A. REED, OF NORTH BRIDGEWATER, ASSIGNOR TO GORDON McKAY, TRUSTEE, OF BOSTON, MASSACHUSETTS.

IMPROVEMENT IN MACHINES FOR UNITING THE SOLES AND UPPERS OF BOOTS AND SHOES.

Specification forming part of Letters Patent No. 132,492, dated October 22, 1872; reissue No. 5,163, dated November 26, 1872.

*To all whom it may concern:*

Be it known that I, ANDREW A. REED, of North Bridgewater, in the county of Plymouth and State of Massachusetts, have invented an Improvement in Machines for Uniting the Soles and Uppers of Boots and Shoes; and I do hereby declare that the following, taken in connection with the drawing which accompanies and forms part of this specification, is a description of my invention sufficient to enable those skilled in the art to practice it.

In uniting the soles and uppers of boots and shoes by nails automatically cut from wire in the same machine that drives them various devices have been used to insure a length to each nail equal to the thickness to be united by it, such thickness varying from toe to heel, and in most of these devices the relative movements toward and from each other of the shoe-support and the presser-foot (between which the parts are griped) is caused to effect changes in the extent of feed of the wire to correspond with changes in the thickness of parts so griped, and, in one instance, a pattern-plate located away from the shoe is used, in which case the pattern, and not the varying thickness of the parts, acts upon the wire feed to change the extent of movement of the wire. In that case, however, the line of the pattern has to be worked out, and as many pattern-plates have to be used as there are sizes and shapes of boots and shoes to be nailed.

In my invention a pattern-wheel is used, in which pattern-wheel is a series of peripheral slides, said slides being parallel to the axis of rotation of the wheel. This wheel is removable from the machine, and its slides are set in a machine by means of the boot or shoe itself; the wheel and the manner of setting its slides for any shoe forming the subject of another application for a patent made by me. The slides having been set for a particular shoe, the wheel and shoe are both removed to the machine for nailing the sole, in which machine the wheel moves coincidently with the shoe, and its pins, as it moves, act upon the wire-feed controlling mechanism to graduate the length of wire cut for each nail in accordance with the thickness of the parts to be united by such nail. It is in the employment of this wheel, and its combination with the wire-feed mechanism, nailing mechanism, shoe-feeding mechanism, and shoe-supporting mechanism of a nailing-machine, that my invention consists.

The drawing represents the head of a shoe-nailing machine embodying my invention, or having my invention applied thereto. A shows the machine in plan; B is a side elevation of it; C is a front elevation; D is an inner-side elevation of the wire-feed, ratchet, and pawl mechanism.

*a* denotes the top of the standard, upon which is mounted the head *b*. The shoe-support or jack is not shown, as it has no immediate connection with my invention, and does not differ from the shoe-supports or jacks of other nailing-machines. *c* denotes the driving-shaft, with which are connected the mechanisms that feed the wire, cut the wire, and feed the shoe. Of this only the wire-feed mechanism is shown. The wire passes between two feed and guide wheels, *d e*, one of which, *d*, is on the end of a shaft, *f*, turning in suitable bearings and carrying a ratchet-wheel, *g*, with which engages a pawl, *h*, pivoted to a lever, *i*, said lever being connected by a link, *k*, with a crank-pin, *l*, extending from a wheel, *m*, on the driving-shaft, a feed-movement of the pawl taking place at each rotation of the driving-shaft, which movement, of course, is constant. Extending under the pawl, between the pivoted end of the pawl and the ratchet-wheel, is a shield, $m^2$, which is attached to a lever, *n*, and, by the position of this shield, the extent of contact of the pawl-tooth with the ratchet is controlled, or the point at which the pawl in its forward movement shall engage with the ratchet. All of this mechanism is old, and may be seen in several patents relating to nailing-machines. The lever *n* is connected by a link, *o*, with an arm, *p*, pivoted on the driving-shaft and held down by the stress of a suitable spring. This arm carries a button, *q*, that rests upon the slides *r* of the pattern-wheel *s*, the wheel *s* turning on a pin, *t*, that holds the wheel upon an arm, *u*, extending from the head. On the bottom of the wheel *s* are gear-teeth *v* that engage with the teeth of a worm, *x*, on the driving-shaft. When the wheel and shoe are placed upon the machine the wheel is placed in engagement with the worm at the index-point *y*, this being the point where the setting of the slides by the shoe is begun, and the shoe is similarly positioned for the nailing to commence at the point which was used in commencing to set the wheel.

It will be obvious that the position of each slide, as the slide comes under the button *q*, will cause a length of nail to be cut in accordance with the thickness of parts to be nailed by it.

I claim—

In combination with the wire-feed and feed-controlling mechanism, a wheel or pattern having slides, arranged and operating substantially as and for the purpose described.

Executed this 7th day of September, A. D. 1872.

ANDREW A. REED.

Witnesses:

FRANCIS GOULD,
M. W. FROTHINGHAM.